(12) United States Patent
Rowe et al.

(10) Patent No.: US 7,908,992 B2
(45) Date of Patent: Mar. 22, 2011

(54) SYSTEM AND METHOD FOR DUSTING SOFT CAPSULES

(75) Inventors: Dennis Rowe, Swindon (GB); Marc Brunagel, Hameau de Pitegny (FR)

(73) Assignee: R.P. Scherer Technologies, LLC, Carson City, NV (US)

( * ) Notice: Subject to any disclaimer, the term of this patent is extended or adjusted under 35 U.S.C. 154(b) by 1058 days.

(21) Appl. No.: 11/651,370

(22) Filed: Jan. 9, 2007

(65) Prior Publication Data

US 2008/0166477 A1   Jul. 10, 2008

(51) Int. Cl.
  *B05C 19/04*   (2006.01)
  *B05D 1/12*    (2006.01)

(52) U.S. Cl. ......... 118/19; 118/20; 118/24; 118/50; 118/303; 118/309; 427/2.14; 427/2.18; 427/180; 427/425

(58) Field of Classification Search ......... 118/13, 118/19, 20, 24, 50, 50.1, 620, 621, 303, 309; 426/289, 453, 454; 366/183.3, 226, 233, 366/234, 105, 150.1, 182.1; 99/494; 427/2.14, 427/2.18, 180, 424, 425; 221/173, 200, 203; 222/401, 240, 241
See application file for complete search history.

(56) References Cited

U.S. PATENT DOCUMENTS

| | | | |
|---|---|---|---|
| 3,141,792 A | 7/1964 | Lachman et al. | |
| 3,302,608 A | 2/1967 | Coons et al. | |
| 3,529,043 A | 9/1970 | Taylor et al. | |
| 3,958,764 A * | 5/1976 | Carpenter et al. | 241/74 |
| 4,639,383 A | 1/1987 | Casey | |
| 6,209,259 B1 | 4/2001 | Madigan et al. | |
| 7,766,195 B2 * | 8/2010 | Ryan et al. | 222/368 |
| 2003/0232076 A1 | 12/2003 | Makino et al. | |
| 2005/0211244 A1 | 9/2005 | Nilsson et al. | |
| 2009/0220676 A1 * | 9/2009 | Koerblein | 427/2.14 |

* cited by examiner

*Primary Examiner* — Laura Edwards
(74) *Attorney, Agent, or Firm* — Fitxpatrick, Cella, Harper & Scinto (57) ABSTRACT

A capsule dusting system is designed to expose capsules to a dusting agent in a controlled manner. The system incorporates a tumbling basket positioned within an enclosure. The tumbling basket is loaded with capsules and is rotatably connected to a drive shaft. A dust injection system meters the dusting agent into the dust injection system. The dust injection system may include a dusting injector that translates between two positions. At one position, the dusting injector is loaded with dusting agent by a powder supply system. At the other position, the dusting injector is positioned to inject the dusting agent into the tumbling basket. A gas is fluidly connected to the dusting injector to cause the dusting agent to disperse into the tumbling basket. The enclosure contains the dusting agent within the system to reduce the environmental, health, and safety hazards associated with airborne particulates.

21 Claims, 4 Drawing Sheets

SYSTEM AND METHOD FOR DUSTING SOFT CAPSULES

TECHNICAL FIELD

The instant invention generally relates to dusting soft capsules with a dusting agent and, more particularly, relates to a system and method for dusting soft capsules designed to meter a dusting agent into a tumbling basket for controlled, contained dusting of the soft capsules to reduce the environmental hazards associated with dusting, while improving safety.

BACKGROUND OF THE INVENTION

Soft capsules generally consist of a gelatin shell which is produced by extending a mixture of gelatin, plasticizer, and water into a thin sheet. Gelatin, which is normally utilized in such formulations, is defined as a protein obtained by partial hydrolysis of mammalian collagenous tissues, such as skins, tendons, ligaments and bones. Gelatin may also be derived from fish. Capsules formed from such a gelatin sheet may hold a wide variety of substances. The shell of a soft capsule is typically produced by adding, to a gelatin, a plasticizer in an amount of 30-40 wt % with respect to the gelatin, and drying the shell until the water content becomes 5-10%. Depending on the formulation used, once a soft capsule is placed in the mouth, the gelatin allows rapid dispersion of the dosage form.

"Chewable soft" capsules are a type of soft gelatin capsule that is particularly distinguished by both a pleasant chewing experience and a complete or near complete dissolution in a short period of time in the oral cavity. Such capsules are also distinguished by particular fabrication problems, such as excessive stickiness during rotary die encapsulation and sticking of the product to other capsules during post-encapsulation handling. Gelatin capsules with high end water content typically have poor storage performance, sticking to one another in bulk packaging to form an agglomerated mass and often melting during storage. In order to prepare the capsules for packaging and storage, the capsules are generally dried in one or more dryers where the capsules are tumbled while exposed to heated gases at a controlled humidity level.

Following the encapsulation process and the tumble dry process, the capsules may be transferred to numerous subsequent steps in final preparation for packaging. One additional process used to combat capsule stickiness is to transfer the capsules into a polishing pan whereby the capsules are coated with a dusting agent. Most often, the dusting agent is a starch, typically potato or corn starch, although tapioca starch, wheat powder, waxy corn starch powder, and partial alpha starch powder, as well as others, are also effective. The capsules may then be tumbled to produce an even coating of starch. The starch coating inhibits the capsules from sticking to one another. To separate the excess starch from the coated capsules, the capsules are transferred onto a vibratory sieve where they are vibrated to remove excess coating material.

Besides the obvious disadvantages of having additional steps and equipment in a manufacturing process, there are other difficulties associated with the coating process. One such problem is excessive particulate air pollution caused by starch particles becoming airborne. Not only are the airborne particulates a respiratory hazard, but they are an explosive hazard as well. Other problems include respiratory problems, induced by dust, of the machine attendants required to operate the equipment, and, to a lesser extent, housekeeping issues associated with having any type of uncontained powder in a manufacturing environment.

What has been needed is a system of dusting capsules with containment of the dusting agent to reduce exposure of personnel and vital equipment to the dusting agent and to reduce the explosive potential created by airborne dusting agent. The art also has needed a system that does not require sieving and that provides a consistent, controllable coating with efficient use of the dusting agent.

SUMMARY OF THE INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

A capsule dusting system for coating capsules with a dusting agent has a tumbling basket, at least one drive shaft, an enclosure, and a dust injection system. In one embodiment of the instant invention, the tumbling basket is cylindrically shaped with a basket interior surface and a basket exterior surface and having a port on each side extending from the exterior surface to the interior surface. The basket interior surface may have at least one baffle that projects from the basket interior surface such that the baffle contacts the capsules as the tumbling basket rotates.

The drive shaft is rotationally coupled to the tumbling basket. The tumbling basket rotates in relation to the drive shaft causing the capsules to tumble along the basket interior surface. The enclosure creates a compartment that houses the tumbling basket. In one embodiment, the enclosure has a partition wall and a containment lid. The partition wall and the containment lid cooperate to form an enclosure containment surface and an external surface. The enclosure operates to contain the dusting agent within the system.

The dust injection system may have a dusting injector. The dusting injector transports the dusting agent into the tumbling basket. In an embodiment of the present invention, the enclosure has a dust injector port extending from the enclosure containment surface to the external surface.

In another embodiment of the instant invention, the dust injection system has a powder supply system. The powder supply system may meter the dusting agent into the dusting injector. In one particular embodiment of the instant invention, the dusting injector has a pocket and a gas passageway. The pocket holds the dusting agent. The gas passageway is in fluid communication with the pocket and a gas supply. The dusting injector moves between two positions. The first is a powder loading position. The dusting agent is metered into the pocket of the dusting injector when it is in the powder loading position. Once the dusting agent is positioned within the pocket, the dusting injector moves from the powder loading position through the dust injector port to an injection position. The injection position is located where release of the dusting agent will cause the dusting agent to mix with the capsules.

In another embodiment of the instant invention, the tumbling basket has a conductive gasket in contact with the basket exterior surface. The conductive gasket provides an electrical pathway from the tumbling basket to the drive shaft.

In a related embodiment, the enclosure has at least one anti-spark bumper positioned between the enclosure containment surface and the proximal side of the tumbling basket and at least one anti-spark bumper positioned between the enclosure containment surface and the distal side of the tumbling basket. The anti-spark bumpers prevent the tumbling basket from contacting the enclosure containment surface.

The capsule dusting system may be part of a method of dusting gelatin capsules with the dusting agent. Such a method would, overall, utilize the steps of loading the capsules into the tumbling basket, rotating the tumbling basket, and injecting the dusting agent into the tumbling basket.

Following loading of the capsules into the tumbling basket, the tumbling basket rotates. By rotating the tumbling basket with the drive shaft, the capsules are tumbled along the basket interior surface. The next step in the method is injecting the dusting agent into the tumbling basket with the dust injection system. Injection of the dusting agent within the confines of the tumbling basket causes the dusting agent to intermix with the capsules.

In one particular embodiment, during the step of injecting the dusting agent into the tumbling basket, the dusting injector moves from the powder loading position to the injection position. When the dusting injector is in the powder loading position, the dusting agent is placed within the dusting injector. When the dusting injector is in the injection position, the gas is controllably released from the gas supply, travels through the gas passageway, and passes out of the dusting injector through the pocket and thus disperses the dusting agent within the tumbling basket.

In another embodiment of the instant invention, during the step of injecting the dusting agent, the dusting injector may inject a volume of dusting agent into the tumbling basket that is related to the surface area of the capsules. In a related embodiment, during the step of injecting the dusting agent, the powder supply system may meter a volume of the dusting agent into the pocket at a predetermined ratio according to the surface area of the capsules.

The system of the instant invention enables a significant advance in the state of the art. The instant invention is, in addition, widely applicable to a large number of applications. Variations, modifications, alternatives, and alterations of the various preferred embodiments may be used alone or in combination with one another, as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

The capsule dusting system and method of the instant invention enable a significant advance in the state of the art. The preferred embodiments of the device accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the claimed invention.

Figure 1:
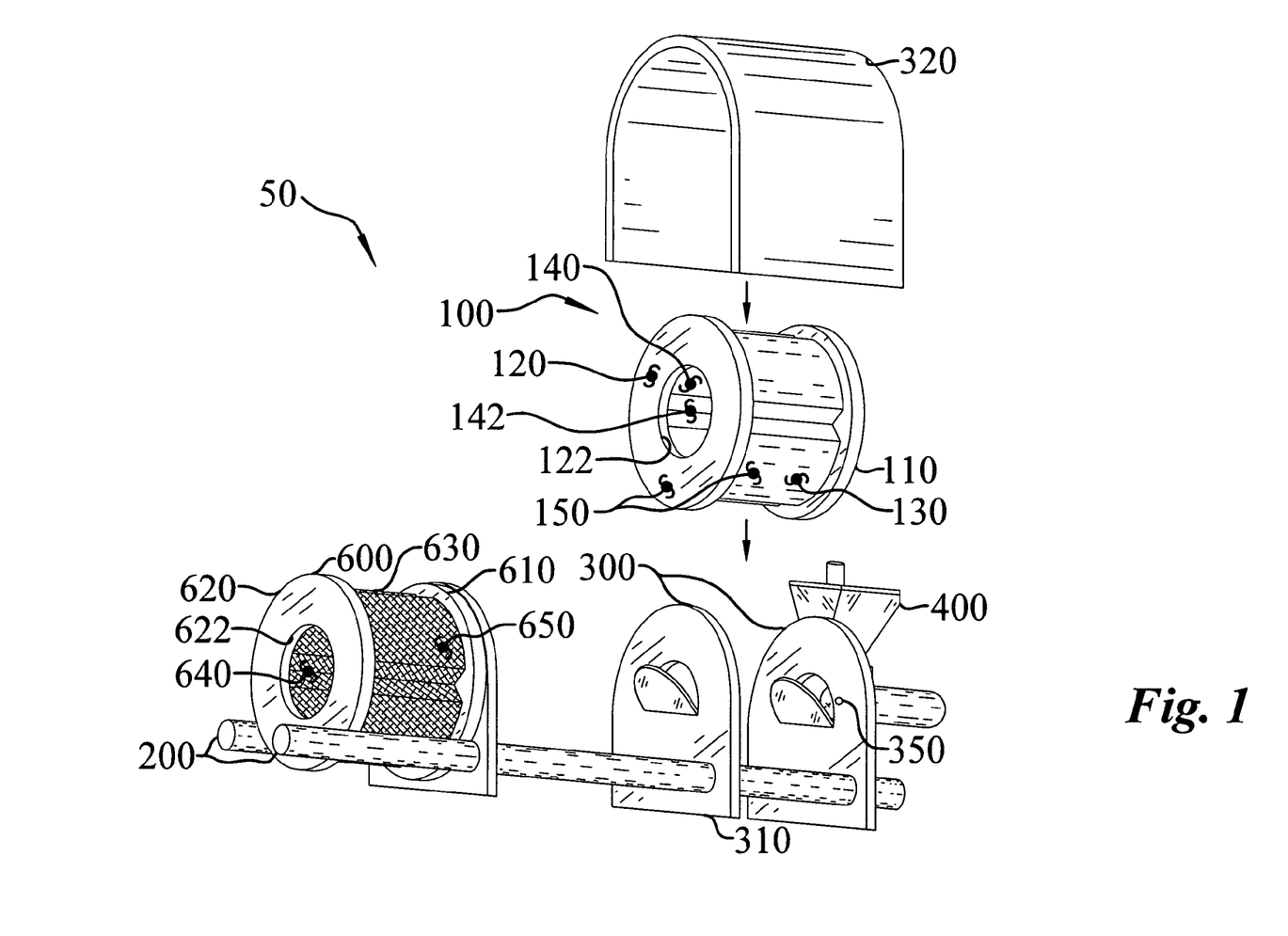
FIG. 1 is a perspective view of an embodiment of a drying tumbler and a tumbling basket, showing the drying basket, the tumbling basket, and an enclosure, not to scale.
Figure 2:
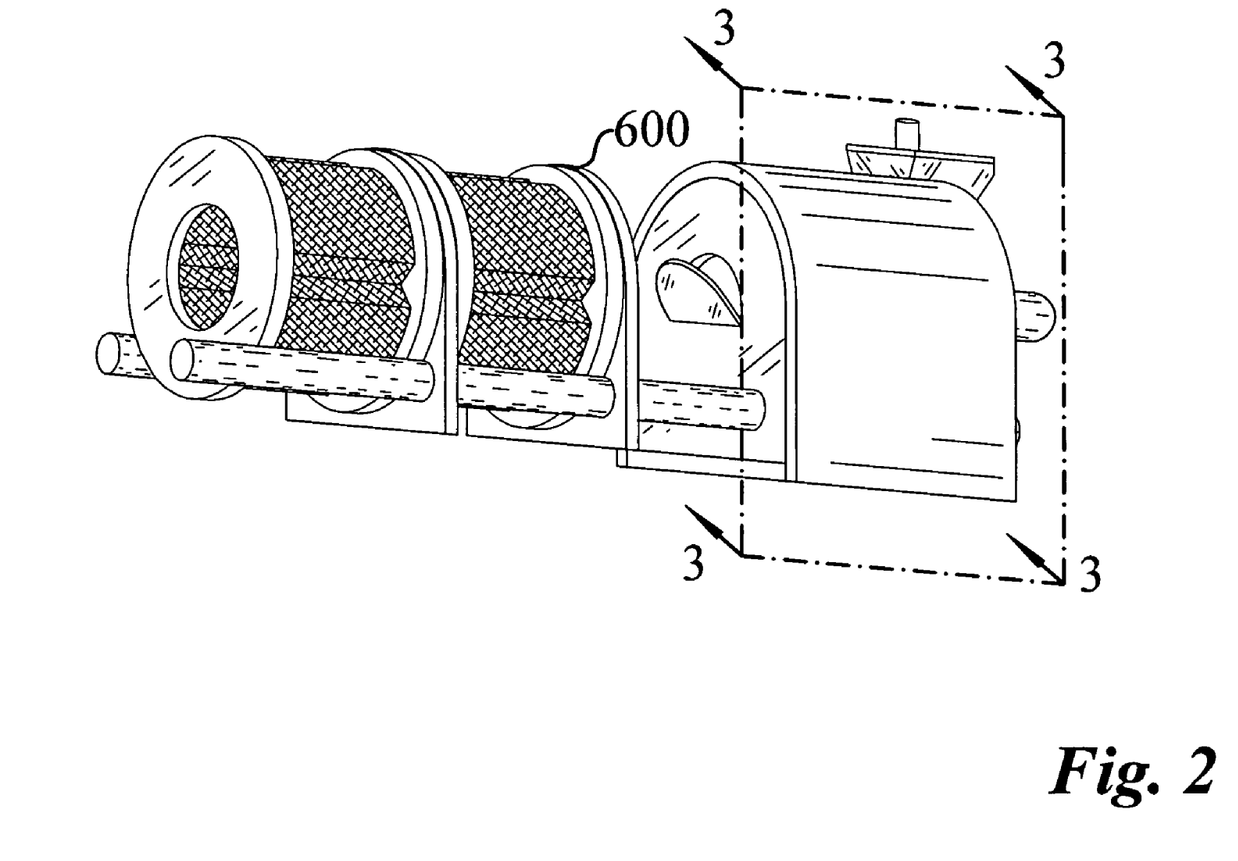
FIG. 2 is a perspective view of an embodiment of a drying tumbler and a tumbling basket, showing the drying basket and the tumbling basket positioned within an enclosure, not to scale.

With reference generally to FIGS. 1 and 2, a capsule dusting system (50) for coating a plurality of capsules (10) with a dusting agent (20) has a tumbling basket (100), at least one drive shaft (200), an enclosure (300), and a dust injection system (400). By way of example and not limitation, the dusting agent (20) may be any one of a variety of starches commonly used in soft capsule coating, such as potato, corn, tapioca, wheat, waxy corn, partial alpha starch powder, and other food grade starches. Each of these components, as well as their interrelationship, will be described in greater detail.

As seen in FIG. 1, in one embodiment of the instant invention, the tumbling basket (100) is cylindrically shaped having a proximal side (110), a distal side (120), and at least one sidewall (130) connecting the proximal side (110) to the distal side (120). The assembly of the proximal side (110), the distal side (120), and the sidewall (130) form a basket interior surface (140) and a basket exterior surface (150). As one skilled in the art will observe, the tumbling basket (100) may be a unitary object rather than constructed of multiple components, and may be configured in non-cylindrical shapes. In the embodiment of the tumbling basket (100) as seen in FIG. 1, the proximal side (110) has a proximal side port (112) extending from the basket interior surface (140) to the basket exterior surface (150). Similarly, the distal side (120) has a distal side port (122) extending from the basket interior surface (140) to the basket exterior surface (150). In one particular embodiment of the instant invention, the capsules (10) enter into the tumbling basket (100) through the proximal side port (112) and are discharged through the distal side port (122), though only one port may be used to load and unload the tumbling basket (100).

Figure 3:
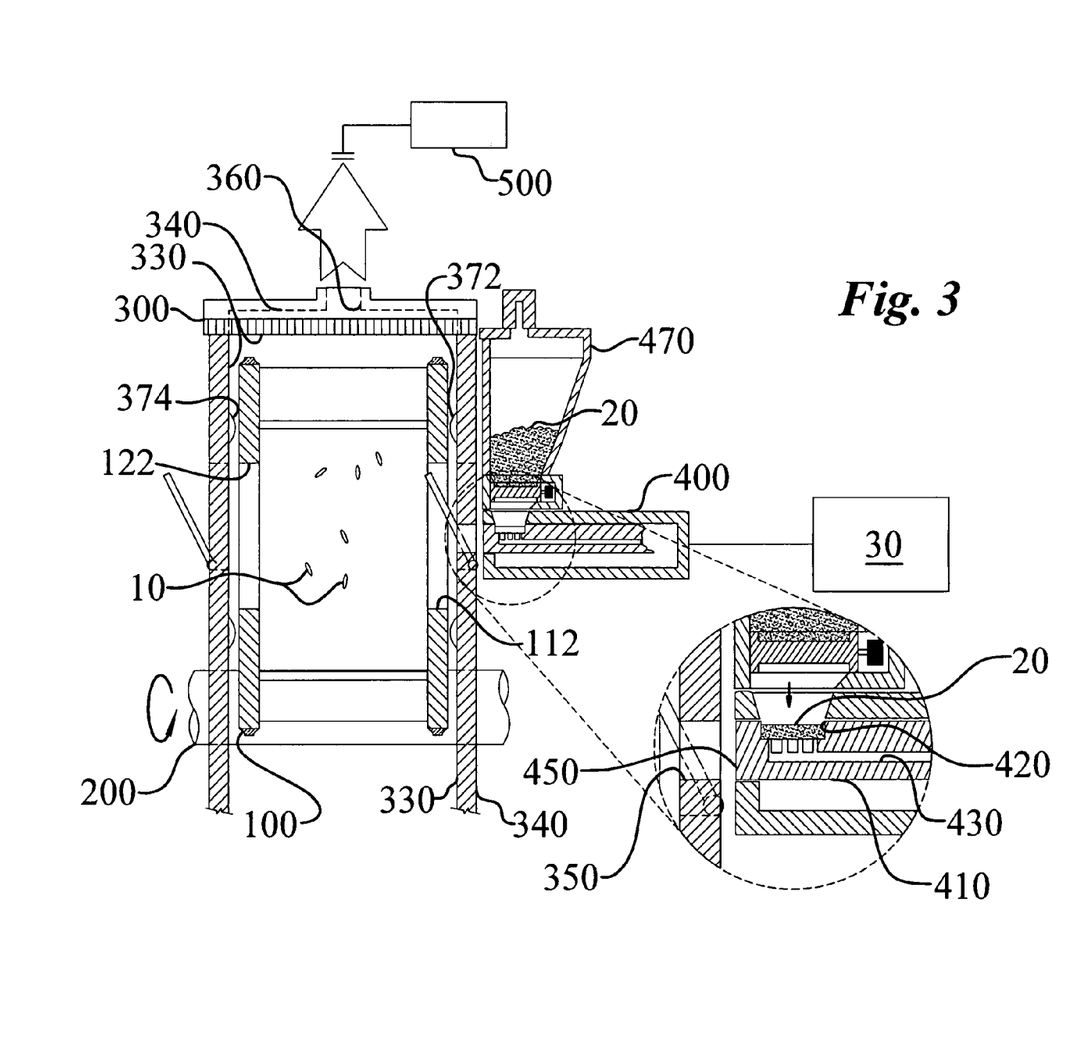
FIG. 3 is a cross-sectional view of the embodiment of the capsule dusting system taken along section plane 3-3 of FIG. 2, showing an embodiment of the dust injection system with the dusting injector in a powder loading position, not to scale.

In another embodiment of the tumbling basket (100), as seen in FIGS. 1 and 3, the basket interior surface (140) has at least one baffle (142) that projects from the basket interior surface (140) such that the baffle (142) contacts the capsules (10) as the tumbling basket (100) rotates, which may cause the capsules (10) to become temporarily airborne. In yet another embodiment of the tumbling basket (100), the sidewall (130) of the tumbling basket (100) may be continuous, or, in other words, made impassable to the dusting agent (20), as seen in FIG. 1, which is in stark contrast to traditional drying baskets. In an embodiment of the tumbling basket (100), the proximal side (110), the distal side (120), and the sidewall (130) are substantially electrically conductive. By way of example and not limitation, the sides (110, 120, 130) may be made of an electrically conductive material, such as a metal, or the sides (110, 120, 130) may be made of an electrically insulating material such as plastic but have a conductive coating layer.

With reference now to FIG. 1, in an embodiment of the present invention, the drive shaft (200) is rotationally coupled to the tumbling basket (100). Thus, the tumbling basket (100)

rotates in relation to the drive shaft (200) causing the capsules (10) to tumble along the basket interior surface (140). As one skilled in the art will appreciate, the tumbling basket (100) may make direct mechanical contact with more than one drive shaft (200), best seen in FIG. 1, or the tumbling basket (100) may be indirectly connected to the drive shaft (100) by, for example, a chain, belt, or gear.

With reference to FIGS. 1, 2 and 3, the enclosure (300) creates a compartment that houses the tumbling basket (100). In one embodiment, as seen in FIG. 1, the tumbling basket (100) is removable from the enclosure (300) to allow loading and unloading the capsules (10) externally of the enclosure (300), though, as one skill in the art will appreciate, the tumbling basket (100) may be securely fixed within the enclosure (300) with the transferring of the capsules (10) accomplished by entrance and exit flaps that are remotely controlled to extend and retract to load and unload the tumbling basket (100). In one embodiment, the enclosure (300), as seen in FIG. 3, has a partition wall (310) and a containment lid (320). The partition wall (310) and the containment lid (320) cooperate to form an enclosure containment surface (330) and an external surface (340). Generally, the enclosure (300) operates to contain the dusting agent (20) within the system (50), thus helping prevent dangerous health hazards or explosive risks.

Figure 4:
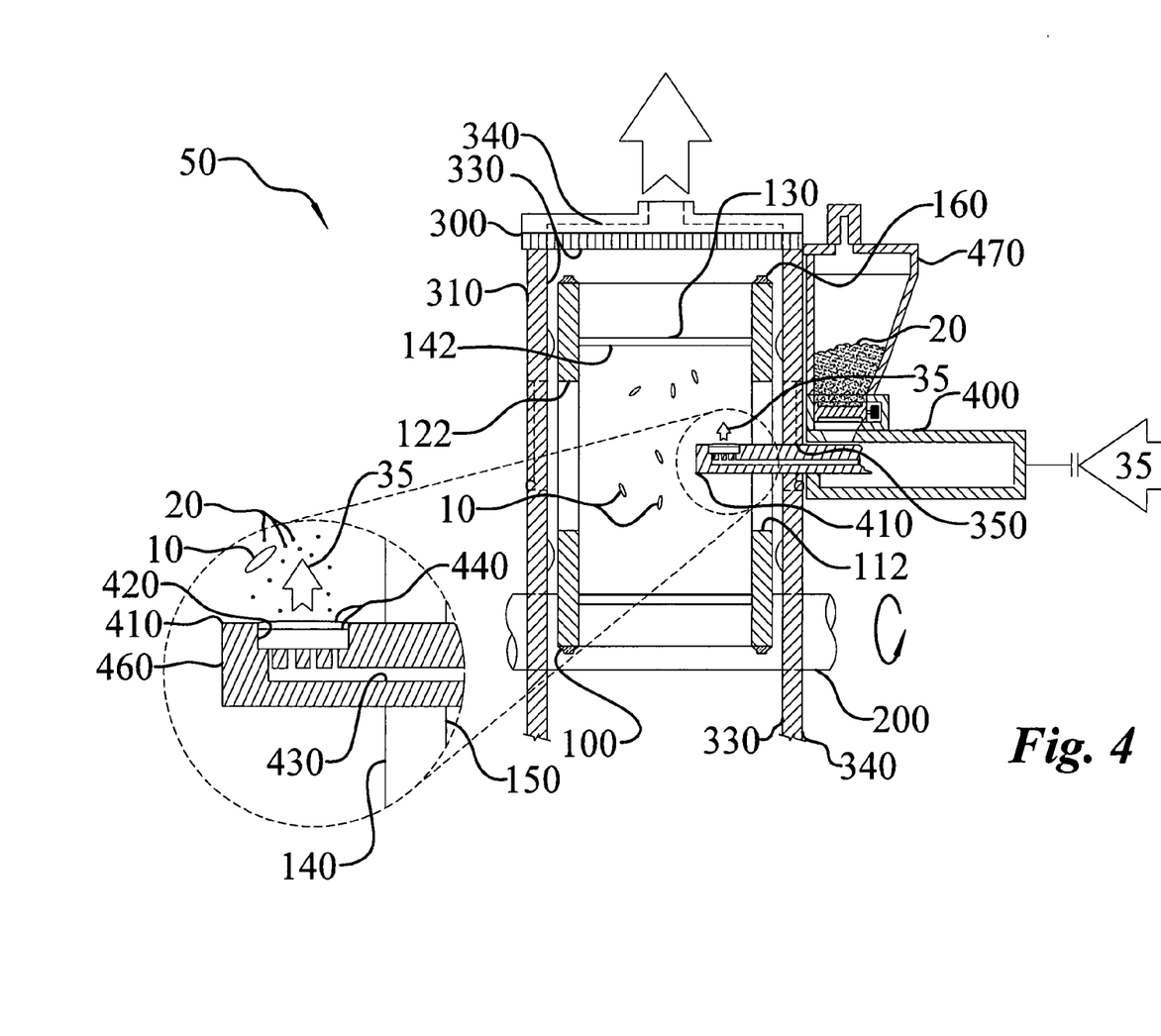
FIG. 4 is a cross-sectional view of the embodiment of the capsule dusting system taken along section plane 3-3 of FIG. 2, showing an embodiment of the dust injection system with a dusting injector in an injection position, not to scale.

In an embodiment of the instant invention, as best seen in FIGS. 3 and 4, the dust injection system (400) may have a dusting injector (410). The dusting injector (410) transports the dusting agent (20) into the tumbling basket (100) thus exposing the capsules (10) to the dusting agent (20). With continued reference to FIGS. 3 and 4, the enclosure (300) has a dust injector port (350) extending from the enclosure containment surface (330) to the external surface (340). The dust injector port (350) provides a passageway into the enclosure (300) for transporting the dusting agent (20). As one skilled in the art will appreciate, the dust injector port (350) may be located at other positions in the enclosure (300), including the containment lid (320). The placement of the dust injection system (400) is dependent on the design of the enclosure (100) with respect to the tumbling basket (100). For instance, the injection system may be positioned remotely from the system (50) with the dusting agent (20) propelled by a gas (35) which enters the enclosure (300) or the tumbling basket (100) through a tube.

In another embodiment of the instant invention, as seen in FIGS. 3 and 4, the dust injection system (400) has a powder supply system (470). The powder supply system (470) may meter the dusting agent (20) into the dusting injector (410) and thus may provide a consistent dose of dusting agent (20) to the capsule (10) at predetermined intervals. As one skilled in the art will observe, the powder supply system (470) may consist of a hopper for storing the dusting agent (20), a metering device, such as a screw feeder, vibratory feeder with a weight scale, or other device used to dispense powders to measure quantities of dusting agent (20) into the dusting injector (410).

In one particular embodiment of the instant invention, as seen in FIGS. 3 and 4, the dusting injector (410) has a pocket (420) and a gas passageway (430). The pocket (420) is a depression or cutout in the dusting injector (410) that holds the dusting agent (20). The gas passageway (430) is in fluid communication with the pocket (420) and a gas supply (30), seen only in FIG. 3. To facilitate the injection of the dusting agent (20) into the tumbling basket (100) the dusting injector (410) translates between two positions. The first is a powder loading position (450), as seen in FIG. 3. The dusting agent (20) is metered into the pocket (420) of the dusting injector (410) when the dusting injector (410) is in the powder loading position (450). Once the dusting agent (20) is positioned within the pocket (420), the dusting injector (410) moves from the powder loading position (450) through the dust injector port (350) to the injection position (460). The injection position (460) is located where release of the dusting agent (20) will cause the dusting agent (20) to mix with the capsules (10), as seen in FIG. 4. Thus, in the injection position (460), the gas (35) travels from the gas supply (30) through the gas passageway (430) into the pocket (420) and the tumbling basket (100) dispersing the dusting agent (20) amongst the capsules (10). The movement of the dusting injector (410) from the powder loading position (450) to the injection position (460) may be accomplished with a variety of devices. By way of example and not limitation, the dusting injector (410) motion may be made with a pneumatic or hydraulic cylinder, a servo motor, and a solenoid, to name only a few.

In one particular embodiment, as seen in the enlarged view of FIG. 4, the dusting injector (410) may have a capsule barrier (440) positioned to prevent the capsules (10) from entering or blocking the pocket (420). The capsule barrier (440), however, permits the dusting agent (20) to escape the pocket (420) and disperse into the tumbling basket (100). By way of example and not limitation, the capsule barrier (440) may be a series of substantially parallel wires spanning the pocket (420) in one direction with the wire-to-wire spacing being less than a smallest capsule dimension. The capsule barrier (440) may also be wire mesh positioned over the pocket (420).

In another embodiment of the instant invention, as seen in FIG. 4, the tumbling basket (100) may have a conductive gasket (160) in contact with the basket exterior surface (150). The conductive gasket (160) provides an electrical pathway from the tumbling basket (100) to drive shaft (200), as seen in FIG. 4. Therefore, the conductive gasket (160) facilitates the dissipation of electrical charge, particularly electrostatic buildup. As one skilled in the art will observe and appreciate, a discharge of electrostatic energy within a cloud of dusting agent (20) may cause an explosion. Therefore, the conductive gasket (160) may provide a means to dissipate the charge buildup. In an embodiment of the invention, the system (50) is electrically grounded and the conductive gasket (160) electrically connects the tumbling basket (100) to the drive shaft (200) or the enclosure (300).

In another embodiment, as seen in FIGS. 3 and 4, the enclosure (300) has at least one proximal anti-spark bumper (372) positioned between the enclosure containment surface (330) and the proximal side (110) of the tumbling basket (100) and at least one distal anti-spark bumper (374) positioned between the enclosure containment surface (330) and the distal side (120) of the tumbling basket (100). The anti-spark bumpers (372, 374) prevent the tumbling basket (100) from contacting the enclosure containment surface (330). As one skilled in the art will observe and appreciate, the contact of the two surfaces, or even the closeness of one surface to another may create a spark or electrical discharge. The anti-spark bumpers (372, 374) are positioned to prevent sparks. Similar to the conductive gasket (160), the anti-spark bumpers (372, 374) are designed to prevent ignition of the dusting agent (20). The anti-spark bumpers (372, 374) may be located on the enclosure containment surface (330), as seen in FIGS. 3 and 4, or alternatively, the anti-spark bumpers (372, 374) may be placed on the basket exterior surface (160).

With continued reference to FIGS. 3 and 4, the enclosure (300) has an exhaust port (360) extending from the enclosure containment surface (330) to the external surface (340). The exhaust port (360) is in fluid communication with a vacuum system (500), as seen only in FIG. 3. Following injection of the dusting agent (20) into the tumbling basket (100), some of the dusting agent (20) may escape into the surrounding enclosure where it is trapped by the enclosure containment surface (330). During the process of dusting the capsules, the vacuum system (500) may be operated to remove excess dusting agent (20) that does not adhere to the capsules (10). By periodically operating the vacuum system (500), escape of the dusting agent (20) past the enclosure containment surface (330) may be reduced or prevented, thus reducing the probability of, and possibly preventing, ignition of the dusting agent (20).

As seen in FIG. 1, one embodiment of the system for dusting capsules (50) may include a drying basket (600). The drying basket (600) may be similarly shaped as the tumbling basket (100). Therefore, in the embodiment, as seen in FIG. 1, the drying basket (600) has a drying basket proximal side (610), a drying basket distal side (620), and a drying basket sidewall (630). The drying basket sidewall (630) connects the two sides (610, 620) forming a cylindrical shaped basket. The drying basket sidewall (630) may be a mesh, screen, or otherwise perforated to permit the direct exchange of gas between the enclosure (300) and the drying basket (600).

The three sides (610, 620, 630) form a drying basket interior surface (640) and a drying basket exterior surface (650). Also, the drying basket proximal side (610) may have a drying basket proximal side port (612) extending from the drying basket interior surface (640) to the drying basket exterior surface (650), and the drying basket distal side (620) may have a drying basket distal side port (622) extending from the drying basket interior surface (640) to the drying basket exterior surface (650). Again, similar to the tumbling basket (100), the drying basket (600) is rotationally coupled to the drive shaft (200). As one skilled in the art will observe, capsules (10) in the drying basket (600) may be dried by controlling the moisture content and temperature of the gas as it passes through the drying basket sidewall (630) while rotating the drying basket (600). The capsules (10) may be dried to within an acceptable range of a targeted moisture content and then the capsules (10) may be transferred to the tumbling basket (100). The control of the moisture content of the capsules (10) with the drying basket (600) may improve the efficiency of dusting and reduce the cost of the system (50). In one embodiment of the instant invention, as seen in FIG. 1, the capsules (10) may be transferred through the partition wall (310) and into the tumbling basket (100). In another embodiment, the capsules (10) may be transferred from the drying basket (600) by removing the drying basket (600) from the enclosure (300) and dumping the capsules (10) into the tumbling basket (100).

The capsule dusting system (50) described above may be part of a method of dusting gelatin capsules with the dusting agent (20). Such a method would, overall, utilize the steps of loading the capsules (10) into the tumbling basket (100), rotating the tumbling basket (100), and injecting the dusting agent (20) into the tumbling basket (100).

In one embodiment of the method of dusting capsules with the dusting agent (20), as seen in FIG. 3, the capsules (10) are loaded into the tumbling basket (100) through the proximal side port (112). The tumbling basket (100) is located within the enclosure (300) having the partition wall (310) and the containment lid (320) such that the partition wall (310) and the containment lid (320) cooperate to form the enclosure containment surface (330) and the external surface (340).

By rotating the tumbling basket (100) with the drive shaft (200), the capsules (10) tumble along the basket interior surface (140). In one particular embodiment of the instant invention, rotating the tumbling basket (100) causes the capsules (10) to contact one or more baffles (142) that extend from the basket interior surface (140). The baffles (142) perturb the capsules (10) possibly causing them to become momentarily airborne.

The next step in the method is injecting the dusting agent (20) into the tumbling basket (100) with the dust injection system (400), as the tumbling basket (100) rotates. Injection of the dusting agent (20) within the confines of the tumbling basket (100) causes the dusting agent (20) to intermix with the capsules (10). As previously disclosed, the dust injection system (400) may consist of a remotely placed supply of dusting agent (20) connected to the enclosure (300) by tubing with transportation of the dusting agent through the enclosure (300) into the tumbling basket (100) being accomplished by the gas (35). The enclosure (300) substantially prevents the dusting agent (20) from escaping into the surrounding environment external to the enclosure (300).

In an embodiment of the instant invention, during the step of injecting the dusting agent (20) into the tumbling basket (100), the dusting injector (410) moves from the powder loading position (450) to the injection position (460), seen only in FIG. 4. In a related embodiment, the dusting injector (410) has the pocket (420) in fluid communication with the gas passageway (430). In turn, the gas passageway (430) is in fluid communication with the gas supply (30), and the enclosure (300) has the dust injector port (350) extending from the enclosure containment surface (330) to the external surface (340). Therefore, during the step of injecting, the dusting injector (410) is first positioned in the powder loading position (450) where the powder supply system (470) loads the dusting agent (20) into the pocket (420). Once the dusting agent (20) is loaded the dusting injector (410) then translates through the dust injector port (350) into the tumbling basket (100). The gas (35) is controllably released from the gas supply (30), travels through the gas passageway (430), and passes out of the dusting injector (410) through the pocket (420) dispersing the dusting agent (20) within the tumbling basket (100).

In another embodiment of the instant invention, following the step of injecting the dusting agent (20) into the tumbling basket (100), there may be a step of vacuuming the enclosure (300). As previously described, the vacuum system (500), as seen in FIG. 3, is in fluid communication with the enclosure containment surface (330) through the exhaust port (360). The vacuum system (500) removes excess dusting agent (20) from the enclosure (300). While operation of the vacuum system (500) may occur following each step of injecting the dusting agent (20), it may only be necessary to operate the vacuum system (500) on a less frequent basis, as the buildup of any excess dusting agent (20) may only occur after multiple injections of the dusting agent (20).

In a related embodiment of the instant invention, the vacuum system (500) maintains the space within the enclosure (300) at a gas pressure which is less than the gas pressure outside the enclosure (300), which may represent ambient air pressure. In this embodiment, air ingress into the enclosure (300) through minute openings may carry any excess dusting agent (20) into the vacuum system (500). If the enclosure is not tightly sealed, this air ingress may be sufficient to evacuate substantially all of the excess dust from the enclosure. However, if the enclosure (300) is tightly sealed, the air flow from outside the enclosure (300) to inside the enclosure (300) may be insufficient to remove excess dusting agent (20). This could occur, by way of example only, when the total air ingress is insufficient to disturb dust that may have adhered to the walls of the enclosure (300) or the outside of the tumbling basket (100). However, when the tumbling basket (100) is unloaded, for example, by opening the exit flap or by opening the containment lid (320), the initial rush of air into the enclosure (300) permits enough air flow to substantially remove any excess dusting agent (20). As with the previous embodiment, the vacuum system (500) thus substantially prevents the dusting agent (20) from escaping the enclosure (300) and prevents accumulation of the dusting agent (20) in quantities that may cause safety or environmental issues.

In another embodiment of the instant invention, during the step of injecting the dusting agent (20), the dusting injector (410) may inject a volume of dusting agent (20) into the tumbling basket (100) that is related to the surface area of the capsules (10). At any given time, the number of capsules (10) in the tumbling basket (100) may be known or ascertainable to within an acceptable margin of error. By having an accurate estimate of the number of capsules (10) and the size of each capsule, the collective surface area of the capsules (10) may be calculable. Also, an optimum ratio of the dusting agent (20) to the capsule weight may also be known. In this embodiment of the instant invention, the volume of dusting agent (20) may be adjusted to provide the optimum dusting of the capsules (10) in an efficient and precise manner. In a related embodiment, during the step of injecting the dusting agent (20), the powder supply system (470) may meter the volume of the dusting agent (20) into the pocket (420) at a predetermined ratio according to the surface area of the capsules (10). As one skilled in the art will observe and appreciate, the powder supply system (470) may incorporate a stand alone computer or may be controlled by one portion of a program operating on a programmable logic controller (PLC) or other similar computer control system. The computer may control weighing the dusting agent (20) into the pocket (420), initiating movement of the dusting injector (410) from the powder loading position (450) to the injection position (460), and cycling the gas (35) to inject the dusting agent (20) into the tumbling basket (100), as well as coordinating the injection of the dusting agent (20) with the loading and emptying of the tumbling basket (100).

In one embodiment of the instant invention, the method of dusting the capsules is completed by unloading the capsules from the tumbling basket (100). Unloading may be accomplished by a variety of equally acceptable operations. By way of example and not limitation, one way to remove the tumbling basket (100) from the enclosure and to empty the capsules (10) may be through either the distal or proximal side ports (112, 122). Another equally effective way is to extend the exit flap into the rotating tumbling basket (100) through the proximal side port (122) for a period of time and allow the capsules (10) to contact and slide out of the tumbling basket (100) on the exit flap.

In yet another embodiment of the instant invention, the method of dusting the capsules (10) begins with the step of drying the capsules in the drying basket (600), as seen in FIG. 1. In the drying basket (600) the capsules (100) are subject to a drying gas of controlled temperature and humidity. The capsules (10) are then brought to within a targeted range of moisture content and temperature prior to being transferred from the drying basket (600) and loaded into the tumbling basket (100). At this point, the capsules (10) may contain a moisture content that is within an optimum range of moisture content to efficiently accept the dusting agent (20) when the dusting agent (20) is injected into the tumbling basket (100) during the injection step. By controlling the moisture content of the capsules (10), the method of dusting the capsules (10) may increase the efficiency of the dusting process and improve capsule quality while reducing environmental and safety hazards, as well as cost.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

INDUSTRIAL APPLICABILITY

The capsule dusting system and method answers a long felt need for a system and method that is capable of coating gelatin capsules with a dusting agent. The system is used to dust capsules by injecting the dusting agent while the capsules are tumbled in a tumbling basket. The present invention discloses a system and method that implements a dust injection system subsequent or during drying of the capsules. The tumbling basket is positioned within an enclosure to contain the dusting agent. The dusting agent is injected into the tumbling basket for intimate contact between the capsules and the dusting agent. The system and method thereby avoids some of the environmental, health, safety, and efficiency problems associated with coating capsules in a polishing pan or otherwise in a container filled with dusting agent. The system of the present invention dusts capsules uniformly, safely, and in a repeatable, cost effective manner.

We claim:

1. A capsule dusting system (50) for coating a plurality of capsules (10) with a dusting agent (20), comprising:
(A) a tumbling basket (100) having a proximal side (110), a distal side (120), and at least one sidewall (130) connecting the proximal side (110) to the distal side (120) such that together the proximal side (110), the distal side (120), and the sidewall (130) form a basket interior surface (140) and a basket exterior surface (150), wherein the proximal side (110) has a proximal side port (112) extending from the basket interior surface (140) to the basket exterior surface (150), the distal side (120) has a distal side port (122) extending from the basket interior surface (140) to the basket exterior surface (150), and the capsules (10) enter into the tumbling basket (100) through the proximal side port (112) and are discharged through the distal side port (122);
(B) at least one drive shaft (200) rotationally coupled to the tumbling basket (100) whereby the tumbling basket (100) rotates in relation to the drive shaft (200) causing the capsules (10) to tumble along the basket interior surface (140);
(C) an enclosure (300) having a partition wall (310) and a containment lid (320), wherein the partition wall (310) and the containment lid (320) cooperate to form an enclosure containment surface (330) and an external surface (340), wherein the tumbling basket (100) is located within the enclosure (300); and (D) a dust injection system (400) having a dusting injector (410), wherein the dusting injector (410) transports the dusting agent (20) into the tumbling basket (100) to expose the capsules (10) to the dusting agent (20).

2. The capsule dusting system (50) of claim 1, wherein
(A) the enclosure (300) further includes a dust injector port (350) extending from the enclosure containment surface (330) to the external surface (340),
(B) the dust injection system (400) further includes a powder supply system (470) for metering the dusting agent (20) into the dusting injector (410),
(C) the dusting injector (410) has a pocket (420), a gas passageway (430), a powder loading position (450), and an injection position (460), wherein
 (i) the pocket (420) holds the dusting agent (20) loaded by the powder supply system (470),
 (ii) the gas passageway (430) is in fluid communication with the pocket (420) and a gas supply (30) such that on demand a gas (35) travels from the gas supply (30) through the gas passageway (430) into the pocket (420),
 (iii) the dusting injector (410) is located at the powder loading position (450) when the pocket (420) is positioned to accept dusting agent (20) from the powder supply system (470), and
 (iv) the dusting injector (420) is located at the injection position (460) when the pocket (420) is in the tumbling basket (100), whereby the dusting injector (420) translates between the powder loading position (450) and the injection position (460) by traveling through the dust injector port (350).

3. The capsule dusting system (50) of claim 2, wherein the dusting injector (410) further includes a capsule barrier (440) positioned to substantially prevent the capsules (10) from entering the pocket (420) while allowing the dusting agent (20) to pass out of the pocket (420) when the dusting injector (410) is in the injection position (460).

4. The capsule dusting system (50) of claim 1, wherein the tumbling basket (100) further includes a conductive gasket (160) in contact with the basket exterior surface (150) and the drive shaft (200) that substantially electrically grounds the tumbling basket (100) to the drive shaft (200).

5. The capsule dusting system (50) of claim 1, further including a drying basket (600) positioned within the enclosure (300), wherein the drying basket (600) is rotatably coupled to the drive shaft (200) and the drying basket (600) is located adjacent to the tumbling basket (10) and is separated from the tumbling basket (100) by the partition wall (310) whereby the capsules (10) enter the drying basket (600) prior to entering the tumbling basket (100), and while the capsules (10) are in the drying basket (600), the capsules (10) are partially dried and are then transferred to the tumbling basket (100).

6. The capsule dusting system (50) of claim 1, wherein the basket interior surface (140) has at least one baffle (142) that projects from the basket interior surface (140) such that the baffle (142) contacts a portion of the capsules (10) as the tumbling basket (100) rotates.

7. The capsule dusting system (50) of claim 1, wherein the sidewall (130) of the tumbling basket (100) is continuous.

8. The capsule dusting system (50) of claim 1, wherein the proximal side (110), the distal side (120), and the sidewall (130) are substantially electrically conductive.

9. The capsule dusting system (50) of claim 1, wherein the proximal side (110) and the distal side (120) of the tumbling basket (100) are metallic.

10. The capsule dusting system (50) of claim 1, wherein the enclosure (300) further includes a proximal anti-spark bumper (372) positioned between the enclosure containment surface (330) and the proximal side (110) of the tumbling basket (100) and a distal anti-spark bumper (374) positioned between the enclosure containment surface (330) and the distal side (120) of the tumbling basket (100), whereby the proximal anti-spark bumper (372) and the distal anti-spark bumper (374) prevent the tumbling basket (100) from contacting the enclosure containment surface (330).

11. The capsule dusting system (50) of claim 1, wherein the enclosure (300) further includes an exhaust port (360) extending from the enclosure containment surface (330) to the external surface (340), wherein the exhaust port (360) is in fluid communication with a vacuum system (500), whereby the vacuum system (500) removes excess dusting agent (20) that does not adhere to the capsules (10).

12. A capsule dusting system (50) for coating a plurality of capsules (10) with a dusting agent (20), comprising:
(A) a tumbling basket (100) having a proximal side (110), a distal side (120), and at least one sidewall (130) that connects the proximal side (110) to the distal side (120) such that together the proximal side (110), the distal side (120), and the sidewall (130) form a basket interior surface (140) and a basket exterior surface (150), wherein
 (i) the proximal side (110) has a proximal side port (112) extending from the basket interior surface (140) to the basket exterior surface (150), whereby the capsules (10) enter into the tumbling basket (100) through the proximal port (112);
 (ii) the distal side (120) has a distal side port (122) extending from the basket interior surface (140) to the basket exterior surface (150), whereby the capsules (10) are discharged from the tumbling basket (100) through the distal side port (122);
 (iii) the sidewall (130) of the tumbling basket (100) is continuous;
 (iv) the basket interior surface (140) has at least one baffle (142) projecting from the basket interior surface (140) so that the baffle (142) contacts a portion of the capsules (10) as the tumbling basket (100) rotates; and
 (v) the proximal side (110), the distal side (120), and the sidewall (130) are electrically conductive;
(B) at least one drive shaft (200) rotationally coupled to the tumbling basket (100) whereby the tumbling basket (100) rotates in relation to the drive shaft (200) causing the capsules (10) to tumble along the basket interior surface (140);
(C) an enclosure (300) having a partition wall (310) and a containment lid (320), wherein
 (i) the partition wall (310) and the containment lid (320) cooperate to form an enclosure containment surface (330) and an external surface (340), wherein
  (a) a dust injector port (350) extends from the enclosure containment surface (330) to the external surface (340), and
  (b) an exhaust port (360) extends from the enclosure containment surface (330) to the external surface (340) and the exhaust port (360) is in fluid communication with a vacuum system (500) whereby the vacuum system (500) removes excess dusting agent (20) that does not adhere to the capsules (10), and
 (ii) the tumbling basket (100) is located within the enclosure (300); and (D) a dust injection system (400) having a dusting injector (410) and a powder supply system (470), wherein the dusting injector (410) has a pocket (420), a gas passageway (430), a powder loading position (450), and an injection position (460), wherein
  (i) the pocket (420) holds the dusting agent (20) loaded by the powder supply system (470),
  (ii) the gas passageway (430) is in fluid communication with the pocket (420) and a gas supply (30) such that on demand a gas (35) travels from the gas supply (30) through the gas passageway (430) into the pocket (420),
  (iii) the dusting injector (410) is located at the powder loading position (450) when the pocket (420) is positioned to accept dusting agent (20) from the powder supply system (470), and
  (iv) the dusting injector (420) is located at the injection position (460) when the pocket (420) is in the tumbling basket (100), whereby the dusting injector (420) translates between the powder loading position (450) and the injection position (460) by traveling through the dust injector portion (350).

13. The capsule dusting system (50) of claim 12, wherein the tumbling basket (100) further includes a conductive gasket (160) in contact with the basket exterior surface (150) and the drive shaft (200) that substantially electrically grounds the tumbling basket (100) to the drive shaft (200).

14. The capsule dusting system (50) of claim 12, wherein the enclosure (300) further includes a proximal anti-spark bumper (372) positioned between the enclosure containment surface (330) and the proximal side (110) of the tumbling basket (100) and a distal anti-spark bumper (374) positioned between the enclosure containment surface (330) and the distal side (120) of the tumbling basket (100), whereby the proximal anti-spark bumper (372) and the distal anti-spark bumper (374) prevent the tumbling basket (100) from contacting the enclosure containment surface (330).

15. A method of dusting capsules with a dusting agent (20), comprising the steps of:
  (A) loading the capsules (10) into a tumbling basket (100) having a proximal side (110), a distal side (120), and at least one sidewall (130) that connects the proximal side (110) to the distal side (120), thereby forming a basket interior surface (140) and a basket exterior surface (150), wherein
    (i) the capsules (10) are loaded into the tumbling basket (100) through a proximal side port (112) that extends from the basket exterior surface (150) to the basket interior surface (140), and
    (ii) the tumbling basket (100) is located within an enclosure (300) having a partition wall (310) and a containment lid (320) such that the partition wall (310) and the containment lid (320) cooperate to form an enclosure containment surface (330) and an external surface (340);
  (B) rotating the tumbling basket (100) with at least one drive shaft (200) that is rotationally coupled to the tumbling basket (100) whereby the tumbling basket (100) rotates in relation to the drive shaft (200) causing the capsules (10) to tumble along the basket interior surface (140); and
  (C) injecting the dusting agent (20) into the tumbling basket (100) with a dust injection system (400) having a dusting injector (410), while continuing to rotate the tumbling basket (100), whereby the dusting agent (20) contacts the capsules (10) and the dusting agent (20) is substantially contained within the enclosure (300) by the enclosure containment surface (330).

16. The method of dusting capsules (10) of claim 15, wherein during the step of injecting the dusting agent (20) into the tumbling basket (100), the dusting injector (410) moves from a powder loading position (450) to an injection position (460), wherein the dusting injector (410) has a pocket (420) in fluid communication with a gas passageway (430), the gas passageway (430) is in fluid communication with a gas supply (30), and the enclosure (300) has a dust injector port (350) extending from the enclosure containment surface (330) to the external surface (340), such that the step of injecting further includes the steps of:
  (i) loading the dusting agent (20) into the pocket (420) of the dusting injector (410) from a powder supply system (470) when the dusting injector (410) is in the powder loading position (450),
  (ii) moving the dusting injector (410) from the powder loading position (450) through the dust injector port (350) to the injection position (460) in the tumbling basket (100), and
  (iii) releasing a gas (35) from the gas supply (30), wherein the gas (35) travels through the gas passageway (430) and out of the dusting injector (410) through the pocket (420) dispersing the dusting agent (20) within the tumbling basket (100).

17. The method of dusting capsules (10) of claim 15, wherein during the step of rotating the tumbling basket (100), the tumbling basket (100) is electrically grounded by a conductive gasket (160) in contact with the basket exterior surface (150).

18. The method of dusting capsules (10) of claim 15, further including the step of vacuuming the enclosure (300) following the step of injecting the dusting agent (20) into the tumbling basket (100), wherein a vacuum system (500) is in fluid communication with the enclosure containment surface (330) through an exhaust port (360) that extends from the enclosure containment surface (330) to the external surface (340), whereby the vacuum system (500) substantially prevents excess dusting agent (20) from escaping the enclosure (300).

19. The method of dusting capsules (10) of claim 15, wherein during the step of injecting the dusting agent (20), the dusting injector (410) injects a volume of dusting agent (20) into the tumbling basket (100) that is related to the surface area of the capsules (10) within the tumbling basket (100).

20. The method of dusting capsules (10) of claim 16, wherein during the step of injecting the dusting agent (20), the powder supply system (470) meters a volume of dusting agent (20) into the pocket (420) that is related to the surface area of the capsules (10) within the tumbling basket (100).

21. The method of dusting capsules (10) of claim 15, further including the step of drying the capsules (10) in a drying basket (600) prior to loading the capsules (10) into the tumbling basket (100), wherein the capsules (10) are treated in the drying basket (600) such that the capsules (10) contain a moisture content within a range of targeted moisture content before the capsules (100) are loaded into the tumbling basket (100).

* * * * *